United States Patent [19]

Mills

[11] Patent Number: 4,606,133

[45] Date of Patent: Aug. 19, 1986

[54] HIGH RESOLUTION DIGITAL INCLINOMETER

[76] Inventor: Floyd J. Mills, 815 Alpine #4, Boulder, Colo. 80302

[21] Appl. No.: 737,786

[22] Filed: May 28, 1985

[51] Int. Cl.⁴ ............................ G01C 9/06; G01C 9/12
[52] U.S. Cl. .......................................... 33/366; 33/346; 33/391; 33/396
[58] Field of Search ...................... 33/366, 346, 363 K, 33/364, 391, 396, 365

[56] References Cited

U.S. PATENT DOCUMENTS

| | | | |
|---|---|---|---|
| 2,407,580 | 9/1946 | Scott | 33/250 |
| 2,598,355 | 5/1952 | Cloud | 33/220 |
| 2,924,022 | 2/1960 | Callahan | 33/220 |
| 2,952,920 | 9/1960 | Cloud | 33/396 |
| 2,990,622 | 7/1961 | Johnson | 33/396 |
| 3,950,859 | 4/1976 | Kramer | 33/352 |
| 4,096,638 | 6/1978 | Schimming | 33/396 |
| 4,253,242 | 3/1981 | McInerney | 33/366 |
| 4,277,895 | 7/1981 | Wiklund | 33/366 |
| 4,467,527 | 8/1984 | North et al. | 33/366 |
| 4,486,844 | 12/1984 | Brunson et al. | 33/366 |
| 4,492,029 | 1/1985 | Tanaka et al. | 33/391 |

FOREIGN PATENT DOCUMENTS

| | | | |
|---|---|---|---|
| 197801 | 1/1978 | U.S.S.R. | 33/366 |
| 972212 | 1/1982 | U.S.S.R. | 33/391 |

Primary Examiner—Willis Little
Attorney, Agent, or Firm—William W. Cochran II

[57] ABSTRACT

An inclinometer for producing high resolution signals of inclination relative to various references and which is capable of displaying inclination angles in various modes. High resolution data signals are produced through the use of a digital encoding wheel which is suspended in equilibrium in a fluid to substantially eliminate frictional forces. A microprocessor, or state logic machine is used to analyze and process the data to provide various displays of inclination including an audible output.

42 Claims, 14 Drawing Figures

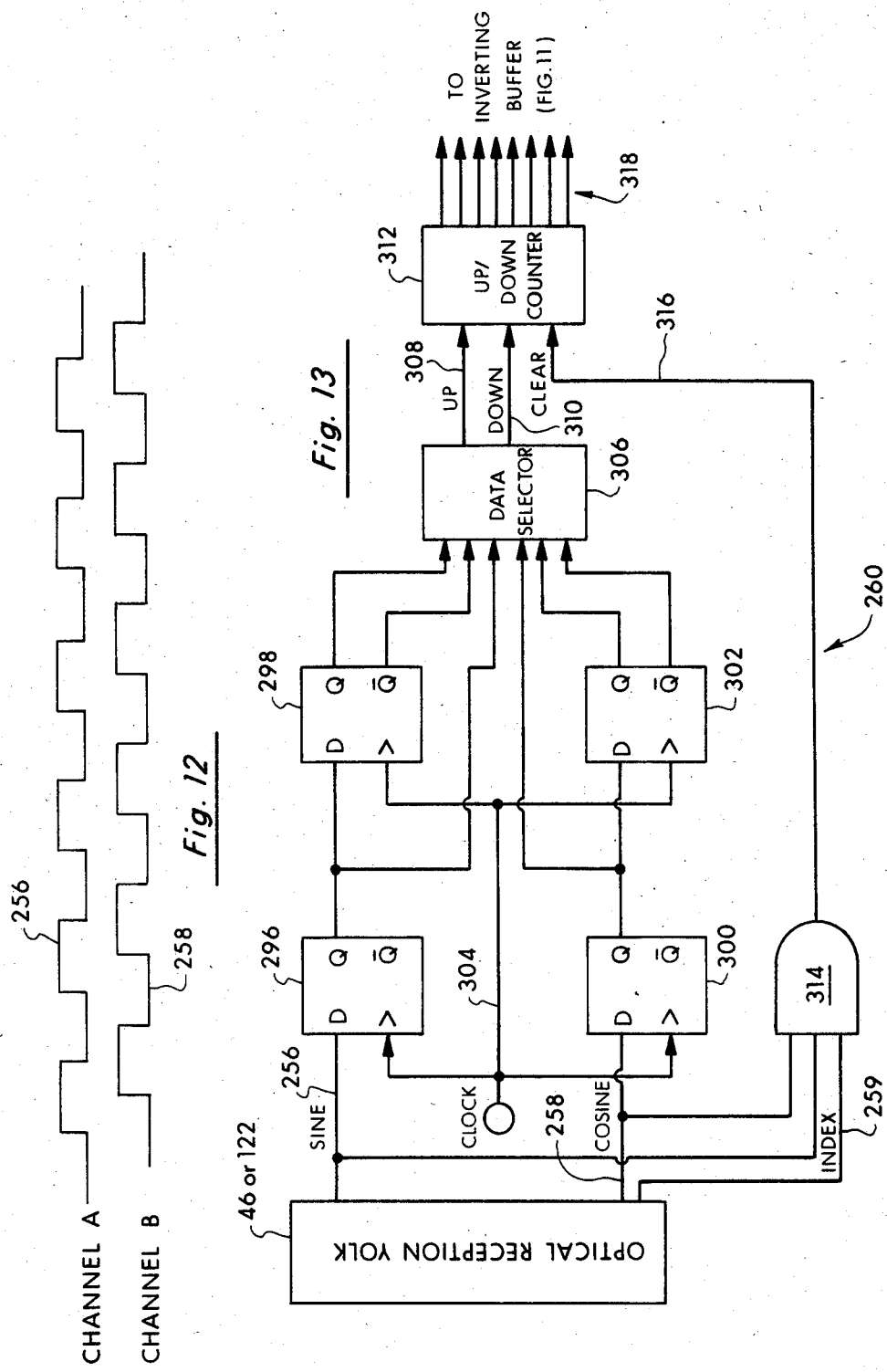

HIGH RESOLUTION DIGITAL INCLINOMETER

BACKGROUND OF THE INVENTION

1. Field of the Invention

The present invention pertains generally to inclinometers and more specifically to high resolution digital inclinometers.

2. Discussion of the Background of the Invention

The need has existed for some time for a portable hand-held inclinometer which has high resolution and is capable of providing a digital read-out of inclination relative to various angles such as level, plumb and preselected tare angles. Additionally, it is desirable to have a device which is capable of measuring a difference angle between two surfaces. Other features such as the production of an audible tone when the device is inclined at a preselected angle, the ability to hold a specific angle for display and other automated features coupled with a high resolution instrument have not been shown in the prior art and constitute features which are greatly needed in such a device.

A patentability search was performed prior to the filing of this application. The following patents were uncovered in the search:

| U.S. Pat. No. | Inventor | Issue Date |
| --- | --- | --- |
| 2,407,580 | Scott | Sept. 10, 1946 |
| 2,598,355 | Cloud | May 27, 1952 |
| 2,924,022 | Callahan | Feb. 9, 1960 |
| 2,952,920 | Cloud | Sept. 20, 1960 |
| 3,950,859 | Kramer | April 20, 1976 |
| 4,096,638 | Schimming | June 27, 1978 |
| 4,277,895 | Wiklund | July 14, 1981 |
| 4,486,844 | Brunson et al. | Dec. 4, 1984 |

U.S. Pat. No. 2,407,580 issued to Scott on Sept. 10, 1946 discloses a long period pendulum which utilizes a light source 18 which is focused by a lense 20 on a Lucite fly wheel 6. Photo cell 26 is arranged to detect light which is transmitted through the Lucite wheel 6. The Lucite wheel is mounted on a ribbon 4 and disposed on a housing which is filled with a liquid 28 having about the same specific gravity as the Lucite fly wheel. A portion of the Lucite fly wheel is painted with an opaque paint to block light as it flows through the wheel. A portion of the wheel is slightly weighted so that it tends to remain in a given rotational position on its axis. A ribbon support of the fly wheel gives practically no static friction and very small restoring forces are produced as compared to the gravitational force on the unbalanced fly wheel. A liquid of approximately the same specific gravity as the fly wheel unweights the ribbon and provides the proper amount of friction to obtain critical damping. The amount of light transmitted through the wheel determines the inclination of the device which is used to drive a servo to return a platform to a level position.

U.S. Pat. No. 2,924,022 issued to Callahan on Feb. 9, 1960 discloses rotary indicators utilizing a pendulum 23 which is placed in equilibrium by the use of a buoyancy float 59 to provide buoyancy approximately equal to the weight of the moving assembly. This is used to minimize and substantially eliminate friction on bearings 17 and 18 which function primarily as guides once the device is in equilibrium. As illustrated in FIG. 10, the rotary indicator comprises a mechanical pointer which aligns with a dial on the device to indicate the rotary position of the inclinometer.

U.S. Pat. No. 3,950,859 issued to Kramer on Apr. 20, 1976 discloses an angular displacement measuring apparatus which ahas electronic circuitry for determining instantaneous angular displacement relative to an external magnetic field or angular displacement in a vertical direction. The Kramer device uses a disk having sequences of transparent and opaque cells in circular tracks which are arranged relative to light sources and track oriented photo-sensitive devices to provide data relative to the orientation of the disk. FIG. 3 discloses standard bearing supports without the use of floatation for eliminating frictional forces.

U.S. Pat. No. 2,952,920 issued to Cloud on Sept. 20, 1960 discloses a ballast compensated pendulum which utilizes a ballast chamber 22 immersed in a damping fluid 20 to provide buoyant effects which are equally distributed around the axis of wire support 11 and approximate the weight of the disk. Portions 12 and 13 of the disk are removed to cause the device to act as a pendulum. Adjustment screw 29 adjusts the pressure on fluid 20 to precisely place disk 10 in equilibrium within fluid 20. The Cloud patent does not disclose a sensing device but refers to U.S. Pat. No. 2,598,355 issued to Cloud on May 27, 1952 which uses a photo-electric cell assembly to sense the unequal distribution of light which is amplified by an amplifier to energize a servomotor.

U.S. Pat. No. 4,096,638 issued to Schimming on June 27, 1978 discloses a pendulum device having floats 102 which partially eliminate friction on bearings 92 and have pointers 98 which indicate the inclination of the device. Floats 102 float on the surface of the fluid disposed in the device.

U.S. Pat. No. 4,277,895 issued to Wiklund on June 14, 1981 discloses an apparatus for measuring acceleration which uses magnetic forces. Light emitting diodes 9 and 10 are located on one side of the plate 8 and a corresponding pair of light detectors 12 and 13 are located on the other side of the plate. The current required to produce a magnetic field to maintain the position of plate 18 is directly proportional to the acceleration of the device. A microprocessor 60 is utilized to quickly and accurately generate the required correction current.

U.S. Pat. No. 4,486,844 issued to Brunson et al. on Dec. 4, 1984 discloses a dual axis inclination measuring apparatus and method which has two sensor devices for measuring the inclination of two surfaces 18 and 19. Indicator unit 3 is capable of freezing a particular reading on its display and can produce a difference angle reading indicative of a difference in inclination of the two surfaces 18 and 19.

As can be seen from these references, the general concept of the use of buoyancy to place the moveable portion of an inclinometer in equilibrium in a fluid to reduce frictional forces has generally been shown in the Scott, Callahan, Cloud and somewhat in the Schimming patents. Additionally, optical detection of the position of a disk has been shown in the Scott and Cloud patents. These devices are relatively crude devices for producing a difference signal by detecting the total amount of light transmitted through a partially opaque disk.

Kramer discloses a more elaborate system of detecting the position of a digitally encoded disk to more precisely determine the location of the disk. Although Kramer is capable of producing a digital display of the position of the disk, Kramer does not use buoyancy to substantially eliminate frictional effects and produce a high resolution output. Moreover, the hard wired electronics utilized by Kramer, as illustrated in FIG. 6, are merely capable of indicating the absolute position of the disk and cannot produce digital displays of inclination relative to the various angles such as plumb, level and tare. Kramer is incapable of performing program functions which can be carried out by microprocessor control to allow the flexibility of producing digital readouts which can indicate these various angles, as well as providing a display of difference angles between two surfaces and generating an audible tone. The disk utilized by Kramer constitutes an absolute encoding disk which is used to produce a direct read-out of the angular position of the disk which is proportional to inclination. To produce a high resolution read-out with an absolute encoding disk, a large number of tracks would be required as well as a large number of detectors and associated circuitry for reading these tracks. Hence, Kramer cannot provide flexibility in producing a digital display signal and cannot practically provide a high resolution read-out.

The Wiklund device discloses the use of a microprocessor in conjunction with an accelerometer. However, the Wiklund device utilizes the microprocessor to calculate and control the generation of error currents for energizing electromagnetic coils to maintain the pendulum in a centered position. The microprocessor device of Wiklund is not used for performing various program functions to provide various digital displays of inclination.

The Brunson et al. reference, on the other hand, discloses the use of a computer to generate angle readings which constitute difference angles of the inclination between two remotely located surfaces. Although Brunson et al. discloses the generation of a difference angle, there is no disclosure of program functions for generating digital signals of inclination relative to plumb, level, and tare angles, the use of an audible indicator or the use of buoyancy to place a disk encoding wheel in equilibrium to provide a high resolution read-out. Rather, the Brunson et al. device is an extremely sensitive device for measuring very slight differences in the inclination of two surfaces 18 and 19 and is incapable of providing a high resolution read-out for a wide range of inclination angles and generation of difference angles from a single sensing unit. Moreover, Brunson et al. does not disclose or teach the use of buoyancy, in any manner, to produce an inclination angle signal.

SUMMARY OF THE INVENTION

The present invention overcomes the disadvantages and limitations of the prior art by providing an inclinometer which is capable of digitally displaying inclination angles relative to plumb, level and tare angles and which utilizes an inclination indicator such as a disk encoder which is capable of providing an extremely high resolution indication of position. The enclosing disk is disposed in a fluid and buoyancy is provided to place the disk in equilibrium in the fluid to substantially eliminate frictional forces and allow precise alignment of the disk with gravitational field forces to produce an extremely high resolution reading of inclination.

The present invention also utilizes an instruction command entry device, such as a keyboard, for generating instruction command signals to select program functions for operating the microprocessor control device. The various program functions are capable of digitally displaying inclination relative to plumb and level, and can select a tare angle, and generate a digital signal indicative of inclination relative to the selected tare angle. The program functions also hold preselected angles and operate an audible indicator to generate an audible signal indicative of alignment of the inclinometer with repsect to plumb, level or a preselected tare angle. The combined use of a disk encoding wheel and the use of floatation to place the disk encoding wheel in equilibrium produces an extremely high resolution signal indicative of inclination of the inclinometer. The microprocessor utilized in the present invention is capable of carrying out a multiplicity of program functions for producing various digital displays which are extremely useful to the operator of the device.

Consequently, the present invention may comprise an inclinometer for producing data signals indicative of inclination angles comprising, a disk encoder for producing high resolution positional data indicative of the position of the disk encoder in the inclinometer, a fluid surrounding the disk encoder for producing a supporting medium for the disk encoder, buoyancy for maintaining the disk encoder in equilibrium in the fluid to substantially eliminate frictional forces on the disk encoder, and a detector for sensing the high resolution positional data representative of inclination of the inclinometer.

The present invention may also comprise an inclinometer for producing various digital display signals of inclination angles with high resolution comprising an enclosure for holding a fluid, a digital encoding wheel pivotally coupled to the enclosure for providing high resolution positional data indicative of the position of the encoding wheel relative to the enclosure, a buoyancy device attached to the digital encoding wheel for maintaining the digital encoding wheel in equilibrium in the fluid to substantially eliminate frictional forces resulting from pivotal coupling of the digital encoding wheel to the enclosure, an optical detector for reading the digital encoding wheel and generating electrical data signals corresponding to the high resolution positional data indicative of the position of the digital encoding wheel relative to the enclosure, an instruction command entry device for generating instruction command signals, programs for performing selected processing functions, a microprocessor for executing the selected processing functions and response to the instruction command signals to process the electrical data signals and produce digital display signals representative of inclination of the inclinometer relative to more than one orientation of the inclinometer, and a display for producing a digital display of the digital display signals.

The present invention may also comprise a process for producing a digital display of inclination of an inclinometer comprising the steps of, buoyantly supporting a digital encoding wheel in a fluid to substantially eliminate frictional forces which would otherwise be produced to support the digital encoding wheel and to allow the digital encoding wheel to align with gravitational forces in a predetermined plane with equal resolution regardless of the degree of inclination in the predetermined plane, optically reading the digital encoding wheel with an optical detector, generating an electrical data signal indicative of inclination, processing the electrical data signal in a microprocessor to produce digital display signals representative of inclination, and generating a visual digital display in response to the digital display signals.

BRIEF DESCRIPTION OF THE DRAWINGS

An illustrative and presently preferred embodiment of the invention is shown in the accompanying drawings, wherein:

FIG. 12 is a schematic diagram of the waveforms produced by the encoder detector of FIG. 11.

FIG. 13 is schematic diagram of the encoder detector of the present invention.

DETAILED DESCRIPTION OF THE INVENTION

Figure 1:
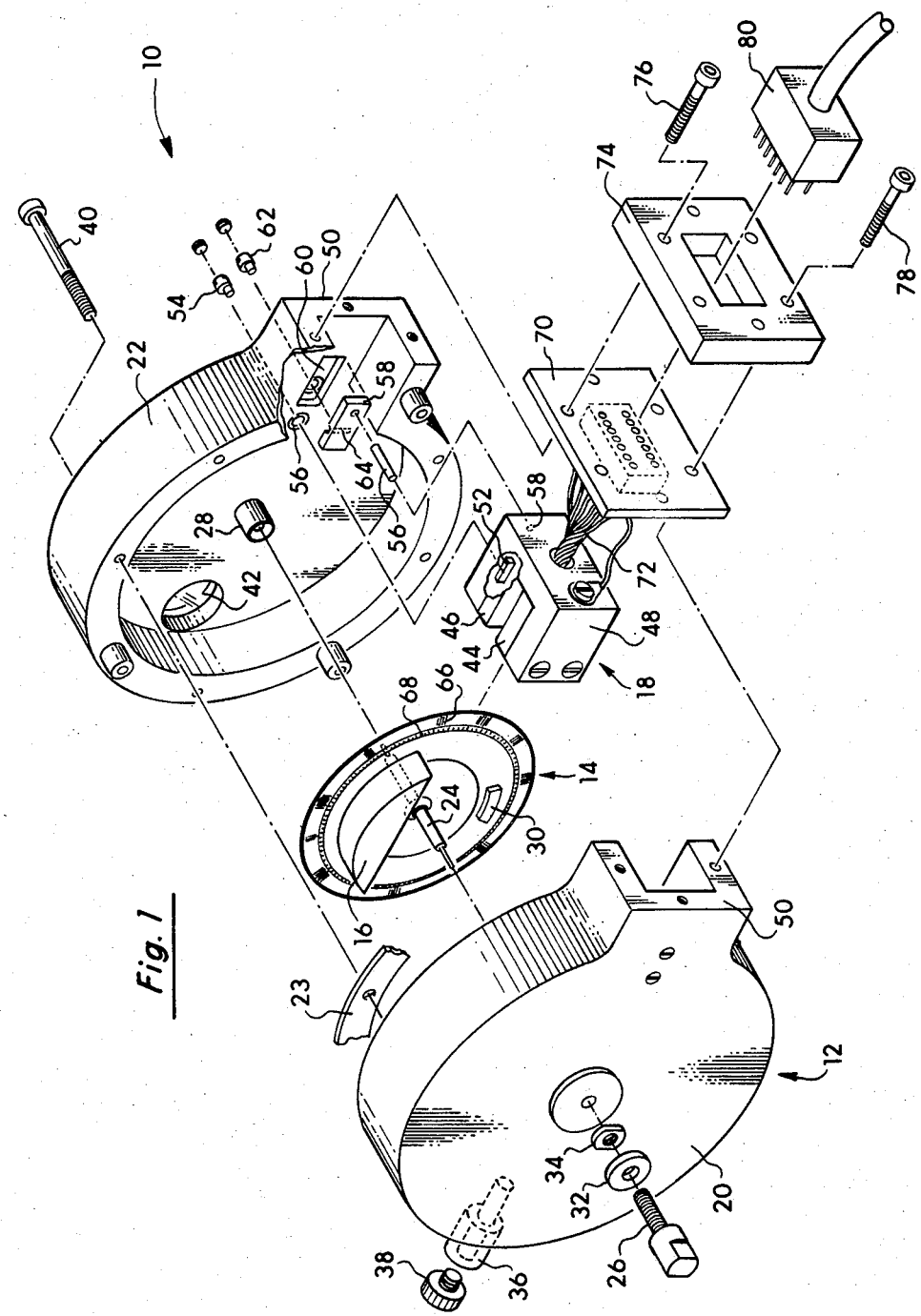
FIG. 1 is a schematic exploded isometric view of one embodiment of the present invention.

FIG. 1 comprises an exploded schematic isometric diagram of one embodiment of the inclinometer 10 of the present invention. Inclinometer 10 comprises an enclosure means 12, an inclination indicator means, otherwise described as a digital encoding wheel means 14, buoyancy means 16 and optical detector means 18. Enclosure means 12 includes enclosure housing portions 20, 22 which hold a fluid (not shown) within the recessed portions of enclosure means 12. Gasket 23 functions to maintain the fluid within the recessed portions of enclosure means 12. Rotatable means 14 includes digital encoding wheel means 15, buoyancy means 16, shaft 24, connector devices 108 and counterweight 30. Digital encoding wheel means 15 is coupled to a shaft 24 which is mounted within bearings 26, 28 which are coupled to enclosure housing portions 20, 22, respectively, Counterweight means 30 is also attached to digital encoding wheel means 15 to aid in alignment of digital encoding wheel means 15 with gravitational forces.

Bearings 26, 28 are threaded into enclosure housing portions 20, 22, respectively during assembly of inclinometer 10. Gasket 32 seals the fluid within the enclosure means 12 while lock knot 34 secures bearing 26 to enclosure housing portion 20. Fluid is inserted into the recessed portions of enclosure means 12 by way of nipple 36. Plug 38 seals the opening in nipple 36 to prevent escape of the fluid. A series of bolts similar to bolt 40 are used to secure the enclosure housing portions. Observation window 42 allows visual observation of the position and movement of optical encoding wheel means 15.

Optical detector means 18 includes an optical transmission means 44 and optical reception means 46 which are mounted on optical yolk means 48. The optical detector means 18 is mounted within the extended portion 50 of enclosure means 12. A slot opening 52 formed in optical yolk means 48 is engaged by a cam 54 which is inserted through opening 56 in enclosure housing portion 22. Rotational movement of cam 54 causes the offset lobe to move the optical yolk means 48 in a vertical direction. Similarly, hole 58 is engaged by pin 57 which is mounted in sliding plate 58. Sliding plate 58 moves in slot 60 of enclosure housing portion 22 in response to movement of cam 62 in slot 64 of sliding plate 58. This causes optical yolk means 48 to move horizontally, as shown in FIG. 1. Consequently, cam 54 adjusts movement of optical yolk means 48 in a vertical direction, while cam 62 adjusts movement of optical yolk means 48 in a horizontal direction to precisely align optical transmission means 44 and optical reception means 46 with the encoding marks 66 and index marks 68 on digital encoding wheel means 15.

Connector device 70 provides a connection for wires 72 which carry high resolution positional data signals produced by optical reception mean 46 and power signals to optical transmission means 44. Connector block 74 connects connector device 70 to extended portion 50 via connecting bolts 76, 78. Cable connector 80 carries electrical signals to an electronic device for carrying out specific functions.

Figure 2:
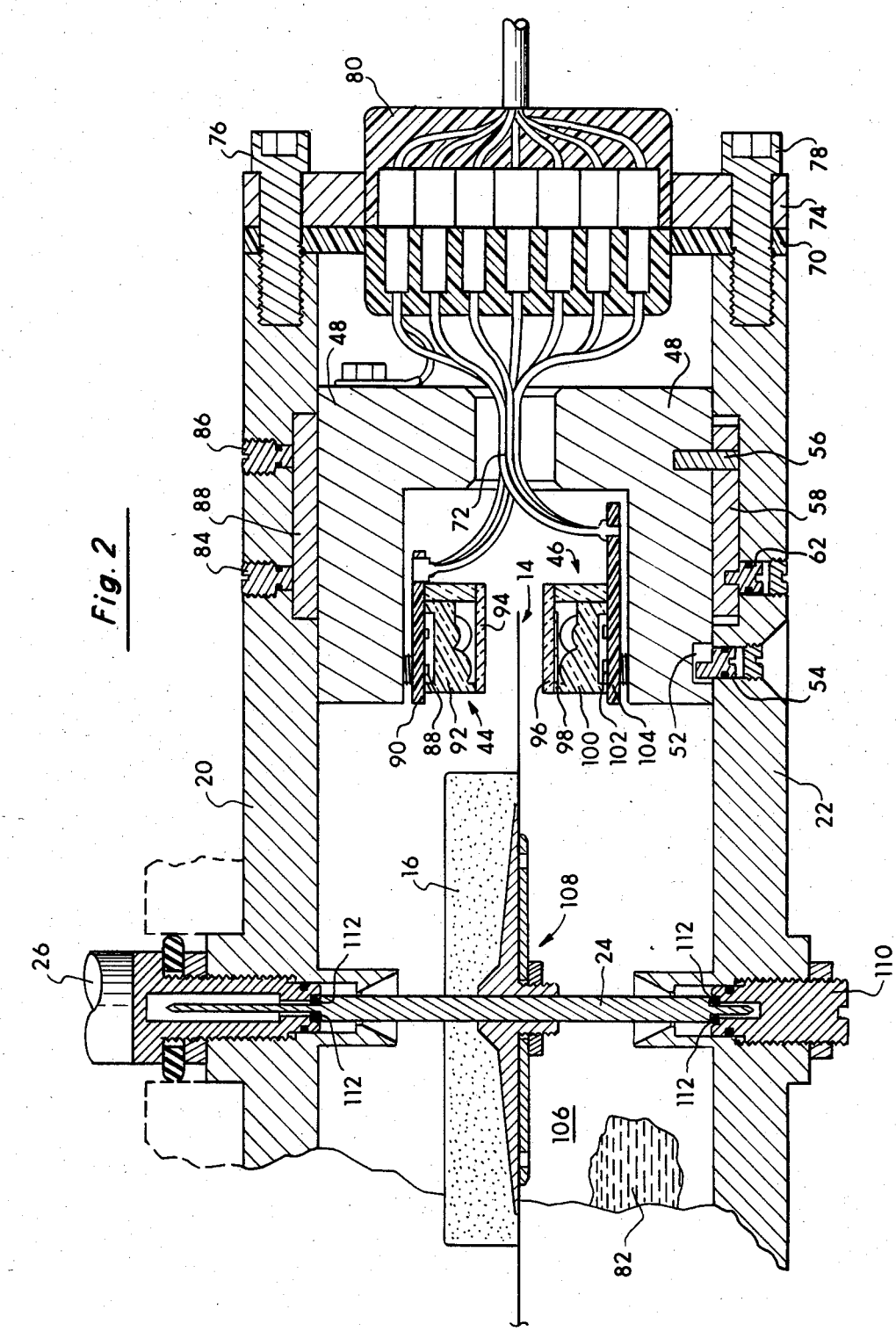
FIG. 2 is a schematic sectional view of the device illustrated in FIG. 1.

FIG. 2 is a schematic sectional view of the device illustrated in FIG. 1. FIG. 2 more specifically illustrates the manner in which cams 54 and 58 control the movement of optical yolk means 48 through the use of slot 52, pin 57 and sliding plate 58. Additionally, an opening in optical yolk means 48 is also illustrated for passage of wires 72. Also, threaded bolts 80, 86 place pressure on plate 88 hold the optical yolk means 48 securely within the recessed portion formed by enclosure housing portions 20, 22. FIG. 2 also illustrates the manner in which threaded bolts 76, 78 hold the connector device 70 and connector block 74 to enclosure housing portions 20, 22, respectively.

FIG. 2 also illustrates details of the detector means 18 including optical transmission means 44 and optical reception means 46. Optical transmission means 44 has a plurality of light emitting diodes (LED's) 88 which are mounted on a printed circuit board 90. The light emitting diodes transmit optical radiation through an optically transmissive lense device 92 which functions to form the optical radiation produced by LED's 88 into a columnar beam. This light is transmitted through a translucent plate 94 and through encoding marks 66 and indexing marks 68 of digital encoding wheel means 15 to optical reception means 46. Optical reception means 46 comprises a translucent plate 96 which transmits light to base plate 98 having transmissive sections aligned to transmit data from alternate pairs of encoding marks 66. The columnar beam of radiation is then transmitted through lenses 100 onto a plurality of optical detectors 102 disposed on printed circuit board 104. This data is then transmitted through data wire 72 to output connector 80. Translucent plates 94, 96 maintain an air gap between optically transmissive lense devices 92, 100, respectively, and a fluid 82 disposed within the recessed portion 106 formed between enclosure housing portions 20, 22. Additionally, translucent plates 94, 96 are aligned substantially normal to the columnar beam transmitted by optically transmissive lense device 92 so that refraction effects do not occur at the interface between translucent plates 94, 96 and fluid 82.

As set forth above, buoyancy means 16 provides buoyancy to rotatable means 14 disposed within inclinometer 10 including digital encoding wheel means 15, shaft 24, and connector devices 108 which function to connect the digital encoding wheel means 15 to shaft 24.

Shaft 24 is supported within cavity 106 by way of bearing means 26 and a similar bearing means 110. Each of these bearing means has bearings 122 disposed therein which function as both radial and thrust bearings. Sufficient clearances provided between the bearing surfaces of bearings 112 and the shaft such that when buoyancy means 16 places rotatable means 14 in equilibrium, essentially no frictional forces are produced between bearings 112 and shaft 24. Bearings 112, consequently, merely acts as a guide for shaft 24. Since no frictional forces are produced, very precise alignment of the digital encoding wheel means 15 can be achieved with gravitational field forces. This allows digital encoding wheel means 15 to provide very high resolution information indicative of inclination.

In operation, the embodiment illustrated in FIGS. 1 and 2 is assembled and filled with a fluid through nipple 36 to a pressure which places rotatable means 14 in equilibrium to substantially eliminate frictional forces produced by bearings 112. Counterweight means 30 and buoyancy means 16 cause the rotatable means 14 to precisely align with gravitational field forces with a high degree of resolution. Optical transmission means 44 produces an optical transmission signal which penetrates the encoding marks 66 and index marks 68 of digital encoding wheel means 15. The optical transmission signal is detected by optical reception means 46. The high resolution positional data which is indicative of position of the digital encoding wheel means and the inclination of the inclinometer, is then transmitted through output lines 72 to cable connector 80.

Figure 3:
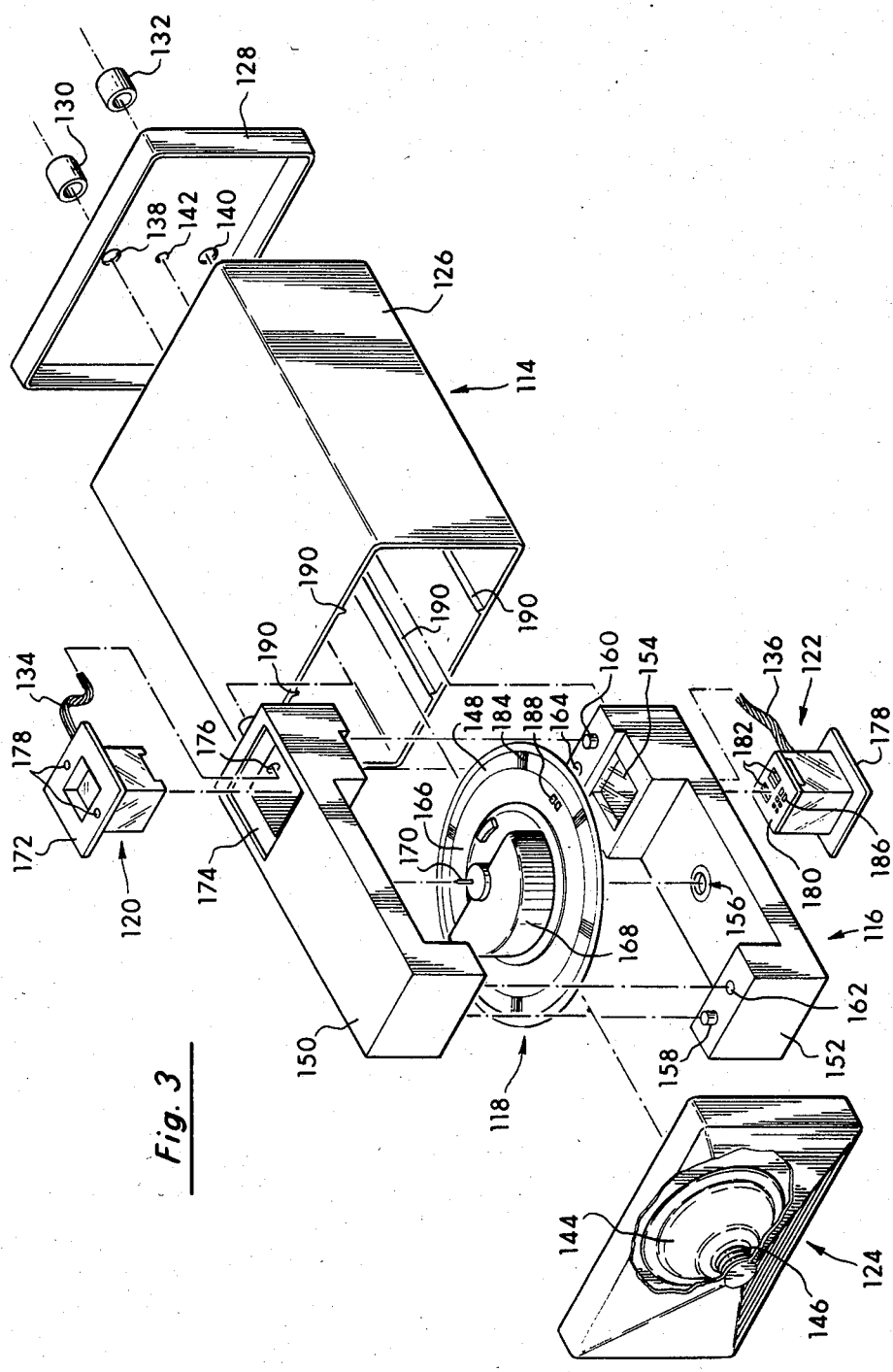
FIG. 3 is a schematic exploded isometric view of another embodiment of the present invention.

FIG. 3 is an exploded schematic diagram of another embodiment of the present invention illustrating an enclosure means 114, an optical carriage means 116, a rotatable means 118, an optical transmission means 120, an optical reception means 122 and pressure and plate 124. Enclosure means 114 includes a body portion 126, an end cap 128 and wire caps 130, 132 which seal fluid disposed within enclosure means 114 and allow wires 134 and 136 from optical transmission means 144 and optical reception means 146, respectively to extend through openings 138, 140 and end plate 128. End plate 128 also has an opening 142 formed therein for insertion of the fluid into the cavity formed within enclosure means 114.

Pressure end plate 124 is inserted over the remaining open end of enclosure means 114 and includes a diaphram 144 which has a pedetermined pressure applied against it produced by a force generated from spring 146. Upon assembly of the embodiment illustrated in FIG. 3, the pressure produced by diaphram 144 prevents the generation of air bubbles or air pockets within enclosure 114 due to changes in temperatures or pressures externally. Formaton of bubbles or air pockets within enclosure means 114 could cause refraction of light within a cavity which could produce incorrect readings of the digital encoding wheel 148 of rotatable means 118.

Optical carriage means 116 comprises a transmission optical carriage unit 150 and a reception optical carriage unit 152. These devices are identical in their structure and can be molded from the same mold. Additionally, they may be injection molded from optically transmissive plastic such that optical transmission window 154 is capable of transmitting light from optical transmission yolk 120 to optical reception yolk 122. Both the transmission and reception optical carriage means have bearing means 156 disposed therein for supporting rotatable means 118. Pins 158, 160 mate with holes 162, 164 to join the two portions 150, 152 of optical carriage means 116.

Rotatable means 118 comprises digital encoding wheel means 148, disk means 166 which is formed from two pieces of identically molded plastic, buoyancy means 168 which is integrally molded into the disk means 166 and shaft 170 which functions to hold together the two molded portions of disk 166 together and support rotating means 118 in optical carriage means 116.

Optical transmission means 120 comprises an integrally molded shell optical transmission yolk 172 having an optical transmission device disposed therein which is connected to wires 134. The integrally molded optical transmission yolk 172 is designed to fit within the recessed portion 174 in transmission optical carriage means 116. Wire 134 exits from the recessed portion 174 by way of hole 176. Holes 178 are disposed in the upper portion of integrally molded optical transmission yolk 172 to align optical transmission means 120 prior to potting integrally molded optical transmission yolk 172 to transmission optical means 150.

Optical reception means 122 is formed from an integrally molded optical reception yolk 178 identical to the structure of integrally molded optical reception yolk 172. Similarly, an optical reception device is disposed within optical reception yolk 178. Phase plate 180 is coupled to optical reception yolk 178 and includes data aperture means 182 for detecting optical encoding data 184 on digital encoding wheel means 148 and digital aperture means 186 for detecting index indicators 188.

Optical carriage means 116 is designed to slide between the raised rib portions 190 of enclosure means 114 to hold optical carriage means 116 in a secure position within the inclinometer.

Figure 4:
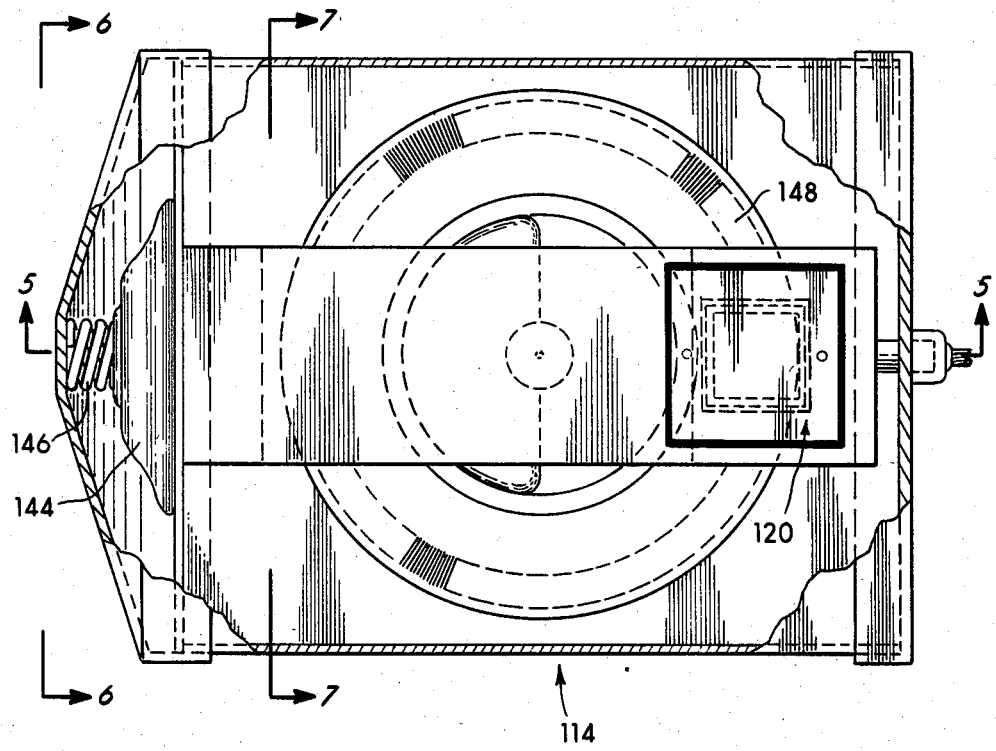
FIG. 4 is a schematic cut-a-way view of the top of the assembled device illustrated in FIG. 3.

FIG. 4 comprises a cut-a-way top view of the inclinometer, as illustrated in FIG. 3. FIG. 4 illustrates the manner in which the optical transmission means 120 is aligned with digital encoding wheel means 148. FIG. 4 also illustrates the manner in which spring 146 applies pressure to diaphram 144 to produce pressure on the fluid enclosed within enclosure means 114.

Figure 5:
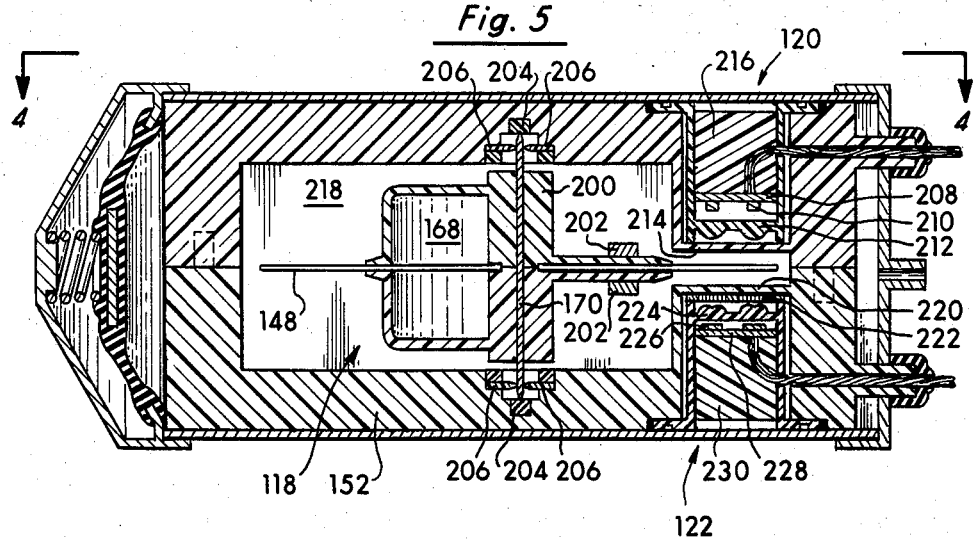
FIG. 5 is a sectional view of the device illustrated in FIG. 4.

FIG. 5 is a sectional view of FIG. 4 illustrating in detail portions of rotatable means 118, optical transmission means 120 and optical reception means 122. Rotatable means 118 is formed from two identically molded pieces of plastic which are fused together over digital encoding wheel 148. The two identically molded pieces of plastic form an enclosed air pocket comprising buoyancy means 168. Center portion 200 comprises a solid molded plastic portion which is frictionally fit to shaft 170. The frictional fit of the shaft 170 holds the two portions of the disk means 166 together while they are fused to digital encoding wheel 148. To provide the proper buoyancy for rotatable means 118, the entire rotatable means 118 is submerged in a fluid identical to the fluid used in the inclinometer and the buoyancy force is measured so that weights 202 can be selected to place rotatable means 118 in equilibrium. Shaft 170 is supported in optical carriage means 116 by thrust bearings 204 and radial bearings 206.

FIG. 5 also illustrates details of optical transmission means 120 and optical reception means 122. Optical transmission means 120 includes a printed circuit board 208 having light emitting diodes 210 mounted thereon. Light produced by the light emitting diodes is formed into a columnar beam by lenses 212 for transmission through translucent portion 214 of optical carriage means 116. A potting material 216 is placed within optical transmission means 120 to prevent fluid 218 from seeping into interior portions of optical transmission means 120.

Light transmitted from optical transmission means 120 penetrates the digital encoding wheel means 148 and is transmitted through an optically translucent portion 220 of reception optical carriage means 152. Phase plate 222 produces phase signals which are focused by refractive lenses 224 onto detectors 226 mounted on printed circuit board 228. A potting material 230 is also used in optical reception means 122 to prevent fluid from entering optical reception means 122.

Figure 6:
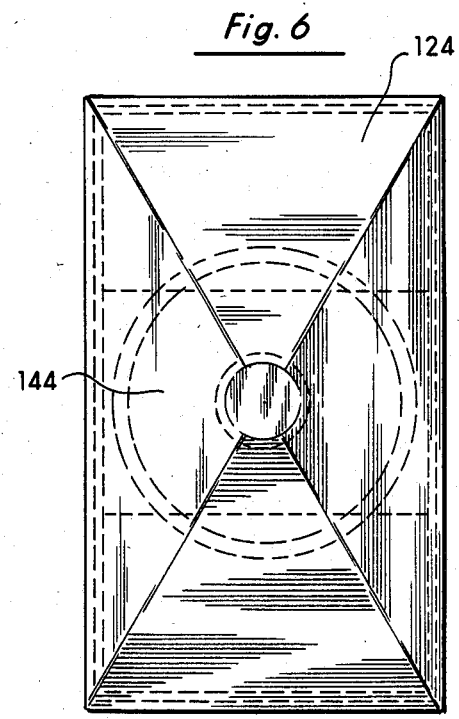
FIG. 6 is an end view of the device illustrated in FIG. 4.

FIG. 6 is an end view of FIG. 4 illustrating the pressure end plate 124. FIG. 6 illustrates the manner in which the diaphram 144 is aligned in the end plate.

Figure 7:
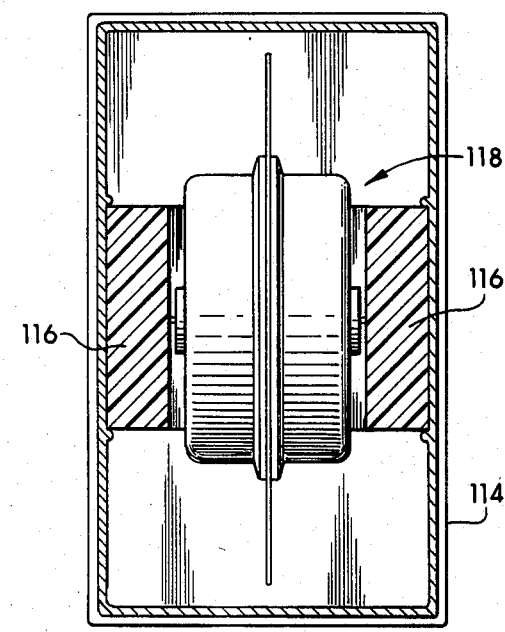
FIG. 7 is a sectional view of the device illustrated in FIG. 4.

FIG. 7 is a sectional view of FIG. 4 illustrating the manner in which the rotatable means 118 is mounted within the inclinometer. FIG. 7 also illustrates the manner in which optical carriage means 116 is mounted within enclosure means 114.

Figure 8:
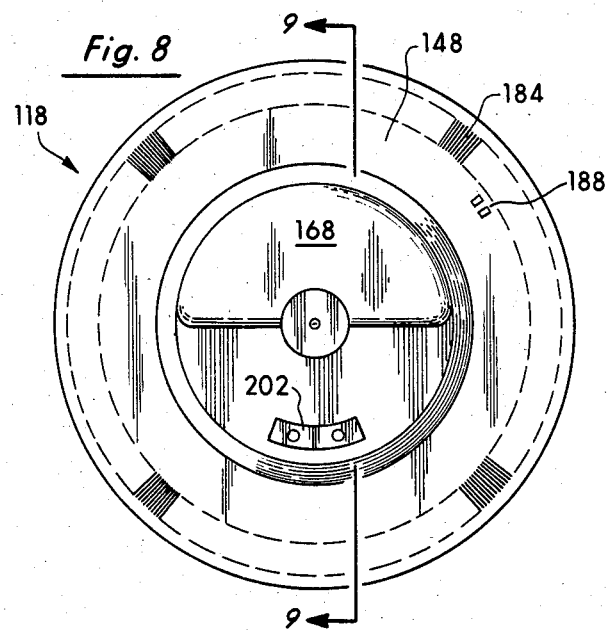
FIG. 8 is a schematic end view of the digital encoding wheel, floatation device and counterweight utilized in accordance with the embodiment illustrated in FIG. 3.

FIG. 8 is a schematic side view of rotatable means 118. Digital encoding data 184 which can comprise a series of transmissive portions in digital encoding wheel means 148 provide high resolution positional data indicative of the position of digital encoding wheel means 148 within the inclinometer. Indexing data 188 provides an index for indicating the initial counting position for counting the digital encoding data 184. FIG. 8 also illustrates buoyancy means 168 and weight means 202.

Figure 9:
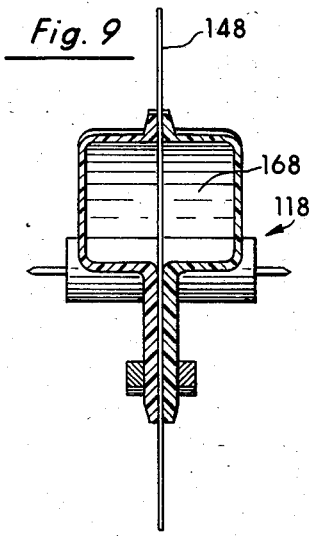
FIG. 9 is a sectional view of FIG. 8.

FIG. 9 is a sectional view of FIG. 8 illustrating the manner in which the two identically molded pieces of the disk means form an enclosed cavity 168 to provide buoyancy to the rotatable means 118. Fusing of the two identically molded pieces to digital encoding wheel means 148 prevents fluid from entering the cavity 168.

Figure 10:
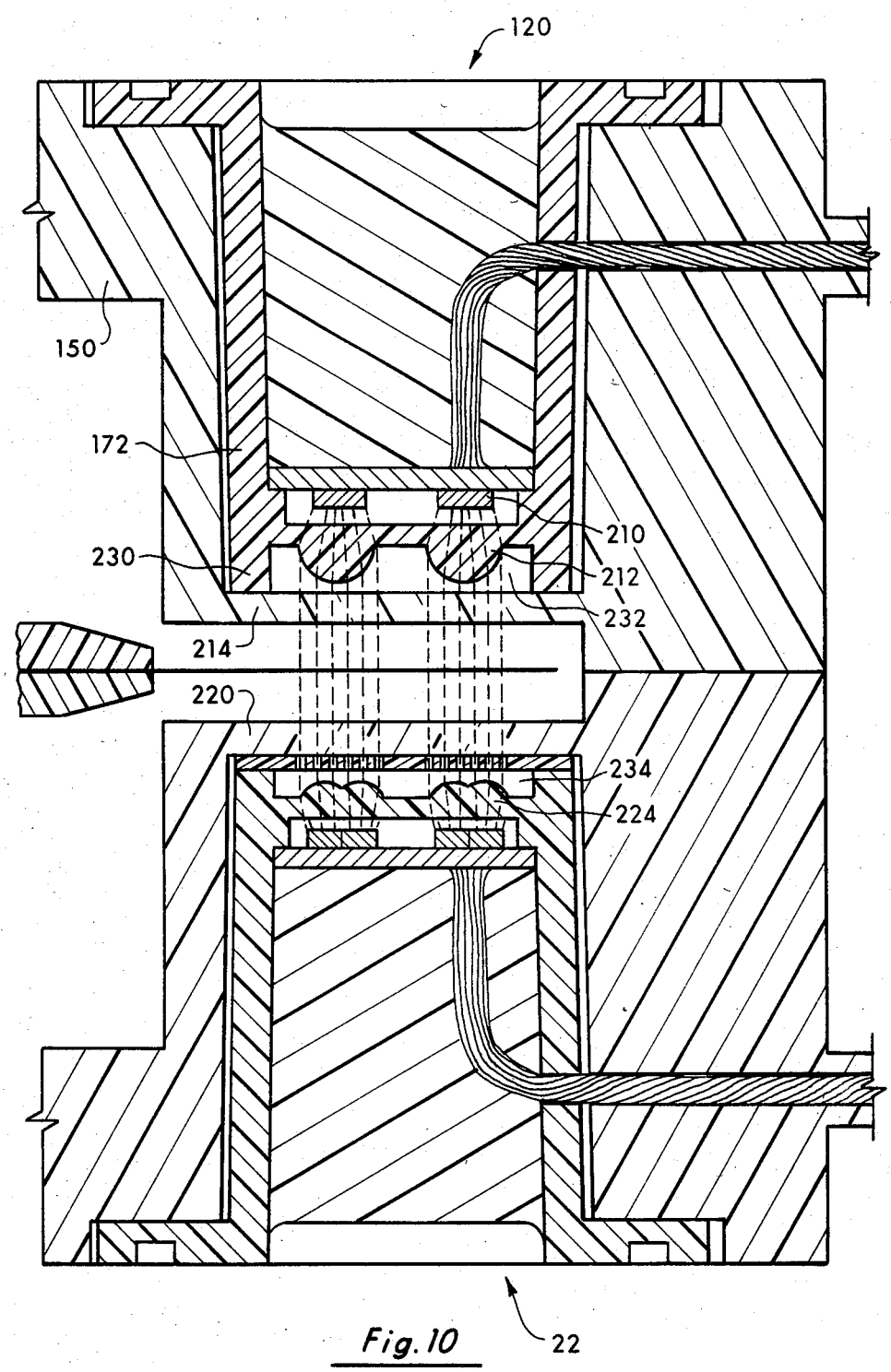
FIG. 10 is a schematic sectional view of the optical yoke, optical components and digital encoding wheel of the present invention.

FIG. 10 is a detailed schematic sectional view illustrating the optical transmission means 120 and optical reception means 122. The integrally molded optical transmission yolk 172 of optical transmission means 120 has feet 230 which rest on optically transmissive portion 214 of transmission optical carriage means 150. As indicated previously, lenses 212 form a columnar beam of light produced by LED's 210 for transmission through optically transmissive portion 214. Optically transmissive portion 214 and optically transmissive portion 220 are substantially normal to the direction of transmission of light to prevent bending of the light at the interface between the fluid and the optically transmissive portions 214, 220. Optically transmissive portions 214, 220 also provide air spaces 232, 234 between lenses 212, 224 and optically transmissive portions 214, 220, respectively. This insures that porper refraction will be achieved between the lenses and the interfacing air.

Figure 11:
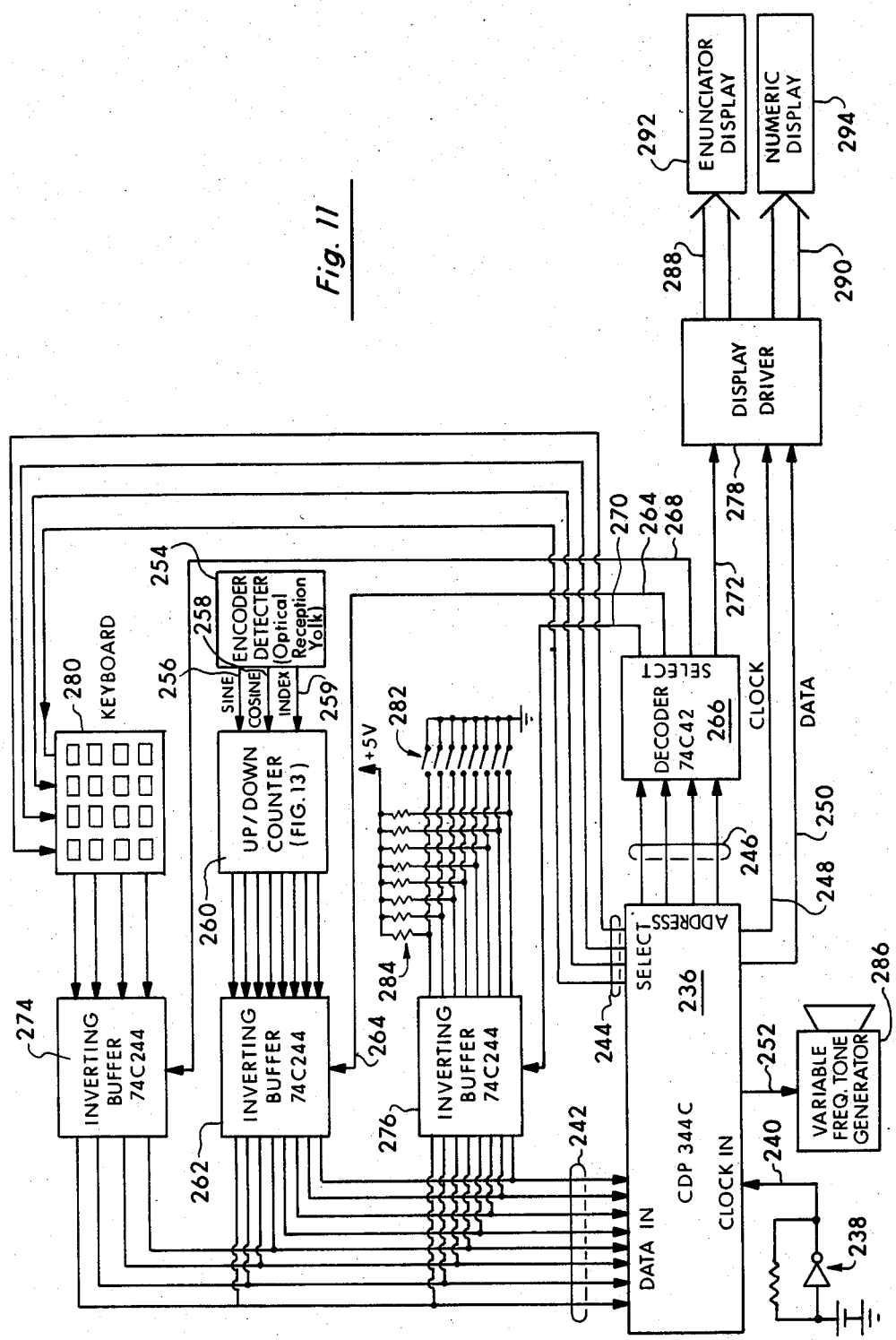
FIG. 11 is a schematic block diagram of the electronic hardware utilized in accordance with the present invention.

FIG. 11 is a schematic block diagram of the electronics portion of the present invention. The heart of the electronics is a microprocessor 236 which comprises a COP 344C microprocessor produced by National Semiconductor, Inc. A clock signal is produced by clock 238 to the clock port 240 of microprocessor 236. Data from various sources is inserted through data port 242 of microprocessor 236. Select signals generated by microprocessor 236 are transmitted through select port 244. Address signals generated by microprocessor 236 are transmitted through address port 246. A clock signal generated by microprocessor 236 is transmitted through output port 248 while data is transmitted through data port 250. A tone signal generated by microprocessor 236 is transmitted through tone port 252.

Encoder detector 254 comprises the optical reception means 122 of the embodiment illustrated in FIGS. 3 through 10 and the optical reception means 46 of the embodiment illustrated in FIGS. 1 and 2. The optical reception means, otherwise known as the encoder detector 254, produces sine and cosine signals which comprise high resolution positional data signals representative of the position of the digital encoding wheel means within the inclinometer. These phase signals are produced as a result of the position of the data aperture means 182 in the phase plate relative to the digital encoding data 184 on digital encoding disk 148. The data aperture means 182 in the phase plate are aligned so that alternate openings in the digital encoding disk 148 are transmitted through the phase plate. This allows the direction of rotation of the digital encoding wheel means to be determined. FIG. 12 more clearly illustrates the sine output 256 and cosine output 258. As can be seen from FIG. 12, the data aperture means 182 cause the detector to produce outputs 256, 258 which are shifted by 90 degrees. Additionally, the index signal is produced by a detector which detects the index indicators 188 on digital encoding wheel means 148.

These three signals, the sine, cosine and index signals, are fed to up/down counter 260, which is illustrated in more detail in FIG. 13. Up/down counter 260 provides a count indicative of the position of the digital encoding wheel means by counting upwards for rotation of the digital encoding wheel means in a first direction and counts downwards for rotational movement of the digital encoding wheel means in the opposite direction. This high resolution positional data count is fed to an inverting buffer 262 which stores and updates the count as it changes and directs this data to the data input of microprocessor 236 via data bus 242 upon activation by select line 264. Select line 264 is produced by decoder 266 which produces an output on one of the four select lines 268, 264, 270, 272 to enable either inverting buffer 274, inverting buffer 262, inverting buffer 276 or display driver 278, respectively, in response to an address signal 246 produced by microprocessor 236. Since inverting buffers 274, 262, 276 are each coupled to data bus 242, only one of the select lines 268, 264, 270 can be enabled at any one time. Select line 272 can be enabled at any time to cause display driver 278 to operate.

Inverting buffer 274 stores a four bit data signal produced by keyboard 280 indicating the particular keyboard button selected. Select lines 244 produced by microprocessor 236 sequentially scan the columns of keyboard 280 such that the information stored in buffer 274, indicative of the row selected on keyboard 280, provides sufficient information to microprocessor 236 to indicate the keyboard buttons selected. The data provided by inverting buffer 274 comprises instruction entry signals or instruction command signals which operate to select processing functions stored in programs in the microprocessor 236. These various processing functions are disclosed in more detail in FIG. 14. The data provided by inverting buffer 262 comprises the high resolution positional data indicative of position of the digital encoding wheel means within the inclinometer. Inverting buffer 276 provides data to indicate the mode of operation of microprocessor 236. Digital signals are generated by dip switches 282 which can be selected by the operator, and pull-up resistors 284 which are connected to the input buffer and a five volt supply voltage.

The microprocessor 236 processes the data in accordance with selected program functions stored within the microprocessor and produces a data output signal 250 which is applied to display driver 278 comprising a digital display signal. Microprocessor 236 also produces an output 252 which is applied to variable frequency tone generator 286 which, in turn, produces an audible tone indicative of alignment of the inclinometer with a preselected angle such as plumb, level, or a selected tare angle. A clock output 248 is also produced by microprocessor 236 which is applied to display driver 278. When display driver 278 is enabled by select line 272, the data signal 250 is processed in display driver 278 to produce enunciator output 288 and a display output 290. Enunciator output 288 comprises a select line for enabling a preselected enunciator display element of enunciator display 292 comprising a series of printed information signals aligned with an enunciator element to indicate the mode of operation of the inclinometer. Enunciator display 292, for example, could indicate that the inclinometer is providing inclination angles relative to plumb or to level or to a preselected tare angle by illumination of one of the enunciator elements. Numeric display signal 290 is applied to numeric display 294 which can comprise an LCD read-out indicating the angle of inclination.

FIG. 13 comprises a detailed block diagram of the operation of up/down counter 260. The optical reception means 46 and 122, otherwise shown as encoder detector 254 in FIG. 11, produces a sine signal 256, as described above, which is applied to a series of two flip-flops 296, 298 which function in a manner similar to a two-stage shift register. Similarly, cosine output 258 from the optical reception means is applied to flip-flops 300, 302, which also function in a manner similar to a two-stage shift register. Clock signal 304 is used as a reset signal to shift the data through the shift registers. Data selector 306 comprises a logic device which is capable of determining the direction of movement of the digital encoding wheel means in a positive direction to produce an upcount, or in a negative direction to produce a downcount. The upcount or downcount either adds or subtracts counts from the current count stored in up/down counter 312. The logic of data selector 306, consequently, produces an upcount 308 and a downcount 310 which is applied to up/down counter 312 which is capable of adding or subtracting an up or down count to a stored count in response to the current and previous data held in flip-flops 296, 300 and flip-flops 298, 302, respectively. The sine signal 256, cosine signal 258 and index signal 259 are all applied to logic gate 314 which produces a clear signal which is applied to up/down counter 312 to clear the count stored within the up/down counter 312. The output 318 produced by up/down counter 312 is applied to inverting buffer 262, as illustrated in FIG. 11.

Figure 14:
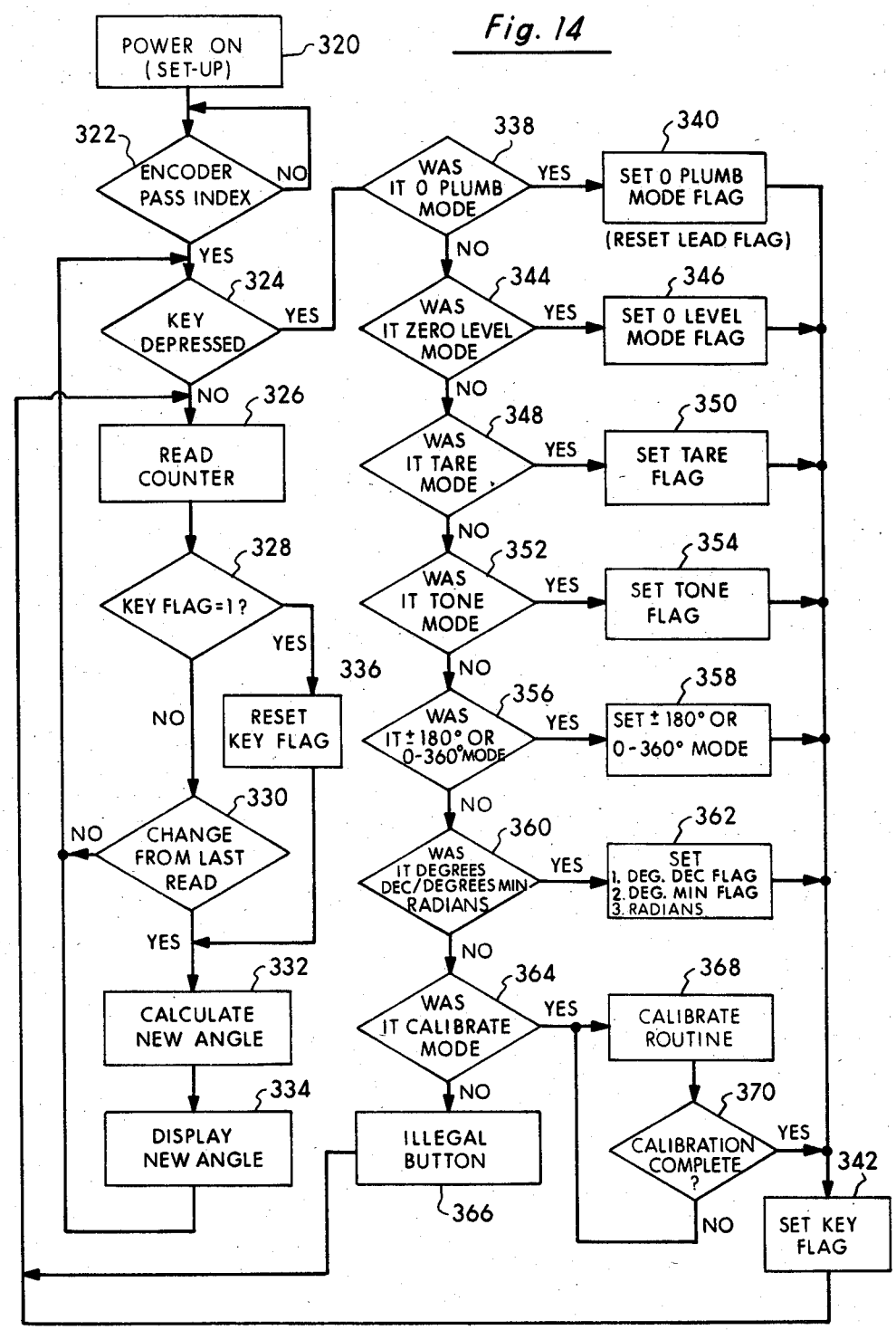
FIG. 14 is a flow diagram of the processing functions performed by the program utilized in accordance with the present invention.

FIG. 14 is a flow diagram illustrating the programming functions performed by microprocessor 236. The first step performed by the program function is the power-up stage, indicated by block 320, which sets the appropriate reference signals within the different registers in the microprocessor. The microprocessor then determines if the indexing marks 68, as illustrated in FIG. 1, and 188, as illustrated in FIG. 3, have been detected by the optical detector means. The indexing marks provide a zero count reference for up/down counter 260 as illustrated in FIG. 13. If the encoder index marks have not been detected, the program loops back onto itself until the index mark is detected. The program then detects if a key has been depressed on keyboard 280, as indicated by decision block 324. If no key is depressed, counter 260 is read by way of inverting buffer 262 via enabling line 264, as indicated by block 326. The program then checks to see if a key flag has been set, as indicated by decision block 328. If the key block has not been set, the program then checks to determine if the count stored in the counter has changed from the last reading. If not, the program returns to decision block 324 to determine if a key has been depressed. The display which appears on the inclinometer remains the same and there is no change in the output of microprocessor 236. However, if the program determines at decision block 330 that there has been a change from the last reading of the counter, a new angle will be calculated in microprocessor 236, as indicated by block 232, and a display data signal 250 will be generated to display a new angle, as indicated by block 334. The program then returns to decision block 324 again to determine if a key has been depressed. If the program determines at decision block 328 that the key flag has been set, it will reset the key flag and proceed directly to calculate a new angle, as indicated by block 332.

If it is determined at decision block 324 that a key has been depressed, the program proceeds to decision block 338 to determine if the key on the keyboard was depressed to indicate that angles should be calculated relative to plumb. If it is determined that it is in zero plumb mode at decision block 338, the zero plumb mode flag is set, as indicated by block 340. The program then proceeds to set the key flag as indicated by block 342 and returns to block 326 to read the counter, and proceeds as indicated above. If it is determined at decision block 338 that the inclinometer is not in zero plumb mode, the program proceeds to decision block 344 to determine if it is in zero level mode, indicating that the zero level button has been pushed on the keyboard to produce inclination angle readings relative to level. If it is determined at decision block 334 that the inclinometer is in zero level mode, the zero level mode flag is set at block 346 and the program proceeds to set the key flag, as indicated at block 342.

If it is determined that the zero level mode button has not been pushed, the program proceeds to decision block 348 to determine if the tare mode button has been depressed, indicating that the inclinometer is to calculate angles with respect to a tare mode. The tare mode operates by reading the inclination angle when the tare mode button is depressed and storing that angle as the zero inclination angle of the inclinometer. If the inclinometer is in tare mode, the tare flag is set at block 350.

If the device is not in tare mode, the program proceeds to decision block 352 to determine if the inclinometer is in the tone mode, i.e., the tone indicator button has been depressed. In the tone mode, the inclinometer produces a tone indicating alignment with a preselected angle such as level, plumb or tare angle. If it is determined that the device was in the tone mode, the tone flag is set at block 354.

If it is determined that the device is not in the tone mode, the program proceeds to decision block 356 to determine if it was in the plus or minus 180 degree mode or zero to 360 degree mode to provide display signals which display angles from plus or minus 180 degrees or zero to 360 degrees. If the inclinometer was in either of these modes a flag is set at block 358 for the specified mode.

If it is not in either one of these modes, the program proceeds to decision block 360 to determine if it was in a mode to display degrees decimal, degress in minutes or to display inclination in radians. A flag is set at block 362 to indicate the mode of operation of the display.

The program then proceeds to decision block 364 to determine if the inclinometer was in the calibrate mode. If not, it is determined at block 366 that an illegal button was pushed and the program proceeds to read the counter at block 326. If the device is in the calibration mode the program proceeds to the calibrate routine 368, and to decision block 370 to determine when the calibration routine is completed. If the calibration routine is not completed, it recycles into calibration routine 368. If the calibration routine has been completed, the key flag is set at block 342. The calibration routine includes a process of sampling of the inclination angle of the inclinometer at two different settings so that an average signal can be generated between the two settings. The average signal corresponds very closely to a zero level signal if the inclinometer is placed on a substantially horizontal surface and then rotated 180 degrees to obtain a second reading. Very precise calibration angles can be produced in this manner.

The present invention therefore provides an inclinometer which is capable of producing data signals indicative of inclination with a very high degree of resolution. This is achieved through the use of a disk encoder which is capable of providing high resolution positional data indicative of the position of the disk within the encoder. The encoder is disposed in a fluid which supports the encoder through the use of a buoyancy device attached to a rotating assembly so as to eliminate friction which would normally be produced to support the rotating assembly such as the friction produced between a shaft and its supporting bearings. This greatly increases the resolution obtainable from the inclinometer. Very precise optical detector devices are utilized to read the digital encoding wheel and provide data signals indicative of inclination of the inclinometer. These data signals can then be processed in a microprocessor or a logic type device, such as a state logic machine, to produce a display signal which can indicate inclination relative to plumb, level or a selected tare signal, and allow selection of a tare signal and produce a digital display of the inclination angle in degrees, radians or in decimal format. Additionally, the microprocessor is capable of producing an audible tone signal to indicate alignment of the inclinometer with a preselected angle, such as a tare angle, level, or plumb and additionally allows calibration of the inclinometer using a highly accurate calibration technique. Moreover, the microprocessor or state logic device can be used to generate a control signal to produce various control functions. For example, the automatic firing of weapons can be controlled automatically by precisely measuring the inclination of the barrel of the weapon, such as large guns or mortars. Moreover, the automated processing functions produced by the microprocessor or state logic device allows automatic reading of data from other devices, such as range finding devices, so that a control signal can be generated by the inclinometer to produce a servo control signal to incline a weapon at precisely the proper angle to produce the detected range. Consequently, the present invention can be used in any application for measuring inclines or inertial forces with a high degree of accuracy, and can be used in conjunction with any type of control or feedback system to implement the system.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical applications to thereby enable others skilled in the art to best utilize the invention in the various embodiments and various modifications as are suited to the particular use contemplated. It is intended that the claims be construed to include other alternative embodiments of the invention except insofar as limited by the prior art.

What is claimed is:

1. An inclinometer for producing data signals indicative of inclination angles comprising:
   disk encoder means disposed to rotate in said inclinometer and aligned with gravitational field forces, said disk encoder means and having a plurality of encoding marks substantially symmetrically spaced on said disk encoder means for providing high resolution positional data indicative of the position of said disk encoder means in said inclinometer;
   phase plate means alternatively aligned with said encoding marks to provide directional information indicative of directional movement of said disk encoder means;
   fluid means surrounding said disk encoder means for providing a supporting medium for said disk encoder;
   buoyance means for maintaining said disk encoder means in equilibrium in said fluid to substantially eliminate frictional forces on said disk encoder means; and
   detector means for sensing said directional information and said high resolution positional data to produce said data signals representative of inclination of said inclinometer.

2. The inclinometer of claim 1 further comprising:
   entry means for generating instruction entry signals;
   logic means for generating a control signal in response to said instruction entry signals and said data signals.

3. The inclinometers of claim 1 further comprising:
   entry means for generating instruction entry signals;
   logic means for generating display signals in response to said instruction entry signals and said data signals.

4. The inclinometer of claim 3 further comprising:
   tone generator means for producing an audible tone to indicate alignment of said inclinometer with a predetermined angle.

5. The inclinometer of claim 2 wherein said entry means comprises:
an automated entry device for automatically generating said instruction entry signals.

6. The inclinometer of claim 2 further comprising:
display means for producing a digital display of inclination in response to said data signals.

7. An inclinometer for producing high resolution signals representative of inclination angles comprising:
digital encoding wheel means pivotally coupled to a supporting structure of said inclinometer for providing high resolution positional data indicative of position of said digital encoding wheel within said inclinometer;
fluid means for supporting said digital encoding wheel means;
buoyancy means attached to said digital encoding wheel means for maintaining said digital encoding wheel means in equilibrium in said fluid to substantially eliminate friction forces resulting from said pivotal coupling of said digital encoding wheel means to said support structure;
optical detector means for reading said digital encoding wheel means and generating electrical data signals corresponding to said high resolution positional data indicative of said position of said digital encoding wheel means within said inclinometer;
instruction command entry means for generating instruction command signals;
program means for performing selected processing functions;
microprocessor means for executing said selected processing functions in response to said instruction command signals to process said electrical data signals and produce data signals representative of inclination of said inclinometer.

8. The inclinometer of claim 7 wherein said instruction command entry means comprises:
tare entry means for producing a tare instruction command signal to instruct said microprocessor means to store an electrical data tare signal representative of a tare angle comprising an inclination angle of said inclinometer upon generation of said tare instruction command signal.

9. The inclinometer of claim 7 wherein said microprocessor means comprises:
means for performing a program function to generate a tare display signal representative of said tare angle;
means for performing a program function to produce a display signal representative of inclination of said inclinometer relative to said tare angle.

10. The inclinometer of claim 9 wherein said programming means comprises:
means for programming said microprocessor to process said data signals and generate display signals representative of inclination of said inclinometer relative to level.

11. The inclinometer of claim 10 wherein said programming means comprises:
means for programming said microprocessor to process said data signals and generate display signals representative of inclination of said inclinometer relative to plumb.

12. The inclinometer of claim 11 wherein said programming means comprises:
means for programming said microprocessor to calibrate said inclinometer by generating an average signal from at least two separate sets of said data signals.

13. The inclinometer of claim 12 wherein said programming means comprise:
means for programming said microprocessor to generate display signals for displaying said inclination angles in degrees.

14. The inclinometer of claim 13 wherein said programming means comprises:
means for programming said microprocessor to generate display signals for displaying said inclination angles in radians.

15. The inclinometer of claim 13 further comprising:
counterweight means disposal on said inclination indicator means for producing a lever arm to align said inclination indicator means with gravitational field forces.

16. The inclinometer of claim 13 wherein said optical detector means comprises:
counterweight means disposed on said inclination indicator means for producing a lever arm to align said inclination indicator means with gravitational field forces.

17. The inclinometer of claim 16 wherein said optical detector means comprises:
transmission optical yolk means for producing an optical signal for transmission through said digital encoding wheel means;
phase plate means for discriminating phase relationships of said optical signal transmitted through said digital encoding wheel means;
reception optical yolk means for detecting said optical signal and generating said electrical data signals representative of said position of said digital encoding wheel means relative to said enclosure means;
optical support means for separating said transmission and reception optical yolk means from said fluid and providing substantially parallel optically transparent transmission portions which are substantially normal to said transmission of said optical signal through said fluid to prevent refraction by said fluid.

18. The inclinometer of claim 17 comprising:
guide support means for maintaining said optical encoding wheel in a predetermined location with minimal frictional effects while in equilibrium, said guide support means comprising an integral component portion of said optical support means.

19. A device for generating a visual display of inclination in response to inclination data prodcued by an inclinometer comprising:
means for storing said inclination data;
instruction command entry means for generating instruction command signals;
programming means for performing selected processing functions in response to said instruction command signals including processing of said inclination data to produce display signals;
microprocessor means for executing said selected processing functions;
display means for producing a visual display in response to said display signals.

20. The device of claim 19 wherein said programming means comprises means for performing processing functions for generating display signals indicative of inclination relative to plumb.

21. The device of claim 19 wherein said programming means comprises means for performing processing functions for generating display signals indicative of inclination relative to level.

22. The device of claim 19 wherein said programming means comprises means for performing processing functions for generating display signals indicative of inclination relative to a selected tare angle.

23. The device of claim 19 wherein said programming means comprises means for performing processing functions for generating display signals to display information in degrees.

24. The device of claim 20 wherein said programming means comprises means for performing processing functions for generating display signals to display information in degrees.

25. The device of claim 21 wherein said programming means comprises means for performing processing functions for generating display signals to display information in degrees.

26. The device of claim 22 wherein said programming means comprises means for performing processing functions for generating display signals to display information in degrees.

27. The device of claim 18 wherein said programming means comprises means for performing processing functions for generating display signals to display information in radians.

28. The device of claim 20 wherein said programming means comprises means for performing processing functions for generating display signals to display information in radians.

29. The device of claim 21 wherein said programming means comprises means for performing processing functions for generating display signals to display information in radians.

30. The device of claim 22 wherein said programming means comprises means for performing processing functions for generating display signals to display information in radians.

31. The device of claim 19 wherein said programming means comprises means for performing processing functions for selecting a tare angle.

32. The device of claim 19 wherein said programming means comprises means for performing processing functions for calibrating said inclinometer by generating an average signal form at least two separate sets of said inclination data.

33. An inclinometer capable of digitally displaying inclination angles comprising:
   enclosure means for holding a fluid;
   rotatable inclination indicator means immersed in said fluid for indicating the inclination of said enclosure means in at least one plane;
   buoyancy means coupled to said rotatable inclination indicator means for placing said inclination indicator means in equilibrium in said fluid to substantially eliminate friction forces otherwise produced to support said inclination indicator means and to allow said inclination indicator means to align with gravitation field forces with high resolution over a wide range of angles;
   optical detector means for reading said rotatable inclination indicator means and producing data signals representative of said inclination;
   instruction command entry means for generating instruction command signals;
   programming means for performing selected processing functions in response to said instruction command signals including:
   a. storing a selected tare angle,
   b. calibrating said inclinometer,
   c. generating display signals indicative of:
      (1) inclination relative to plumb,
      (2) inclination relative to level,
      (3) inclination relative to said selected tare angle,
   d. generating display signals for displaying inclination in degrees,
   e. generating display signals for displaying inclination in radians,
   microprocessor means for performing said selected processing functions;
   display means for producing a visual display in response to said display signals.

34. A process for producing a digital display of inclination of an inclinometer comprising the steps of:
   buoyantly supporting a digital encoding wheel in a fluid to substantially eliminate frictional forces which would otherwise be produced to support said digital encoding wheel and to allow said digital encoding wheel to align with gravitation forces in a predetermined plane with equal resolution regardless of the degree of inclination in said predetermined plane;
   optically reading said digital encoding wheel with an optical detector;
   generating an electrical data signal indicative of inclination;
   processing said electrical data signal in a microprocessor to produce digital display signals representative of inclination; and
   generating a visual digital display in response to said digital display signals.

35. The process of claim 34 further comprising the step of:
   generating an audible tone indicative of alignment with a predetermined angle.

36. The process of claim 34 further comprising the step of:
   entering instruction command signals in said microprocessor to select a program function for generating digital display signals representative of inclination relative to plumb.

37. The process of claim 34 further comprising the step of:
   entering instruction command signals in said microprocessor to select a program function for generating digital display signals representative of inclination relative to level.

38. The process of claim 34 further comprising the step of:
   entering instruction command signals in said microprocessor to select a program function for generating digital display signals representative of inclination relative to a preselected tare angle.

39. The process of claim 34 further comprising the step of:
   entering instruction command signals in said microprocessor to select a program function for selecting a tare angle.

40. The process of claim 34 further comprising the step of:
   entering instruction command signals in said microprocessor to select a program function for calibrating said inclinometer from at least two separate sets of said electrical data signal.

41. The process of claim 34 wherein said step of optically reading said digital encoding wheel comprises the step of:
- generating an optical signal from an optical transmission yolk for transmission through said digital encoding wheel;
- discriminating phase relationships of said optical signal transmitted through said digital encoding wheel by transmission of said optical signal through a phase plate;
- detecting said optical signal transmitted through said phase plate by an optical reception yolk.

42. The process of claim 41 further comprising the step of:
- separating said optical transmission yolk and said optical reception yolk from said fluid by supporting said optical transmission yolk and said optical reception yolk in an enclosed optical support structure;
- providing substantially parallel transparent portions on said optical support structure to allow transmission of said optical signal in a direction substantially normal to said parallel transparent portions substantially without refraction.

* * * * *